(12) United States Patent
Soerensen

(10) Patent No.: US 11,060,509 B2
(45) Date of Patent: Jul. 13, 2021

(54) COOLING SYSTEM FOR A SUPERCONDUCTING GENERATOR

(71) Applicant: SIEMENS GAMESA RENEWABLE ENERGY A/S, Brande (DK)

(72) Inventor: Peter Hessellund Soerensen, Brædstrup (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/259,044

(22) Filed: Jan. 28, 2019

(65) Prior Publication Data

US 2019/0234381 A1 Aug. 1, 2019

(30) Foreign Application Priority Data

Jan. 30, 2018 (EP) ..................... 18154252

(51) Int. Cl.

| | |
|---|---|
| *F03D 80/60* | (2016.01) |
| *H02K 55/00* | (2006.01) |
| *H02K 55/02* | (2006.01) |
| *H02K 9/00* | (2006.01) |
| *H02K 9/10* | (2006.01) |

(Continued)

(52) U.S. Cl.
CPC .............. *F03D 80/60* (2016.05); *F03D 9/25* (2016.05); *H02K 1/20* (2013.01); *H02K 9/197* (2013.01); *H02K 55/00* (2013.01); *H02K 55/02* (2013.01); *H02K 7/1838* (2013.01); *H02K 9/19* (2013.01)

(58) Field of Classification Search
CPC .. H01F 6/00; H01F 6/04; H02K 55/00; H02K 55/02; H02K 55/04; H02K 55/06; H02K 9/19; H02K 9/197; H02K 7/183; H02K 7/1838; F03D 80/60; F03D 9/25; Y02E 40/62; Y02E 40/622; Y02E 40/627; Y10S 505/878
USPC .......... 165/104.33, 164; 290/44, 55; 310/52, 310/54, 58, 64; 505/894–895, 899–901; 62/175, 335, 505
See application file for complete search history.

(56) References Cited

U.S. PATENT DOCUMENTS 3,648,082 A * 3/1972 MacNab ................ H02K 19/26
                                                                     310/10
4,079,273 A * 3/1978 Lambrecht ............. H02K 55/04
                                                                   310/52

(Continued)

FOREIGN PATENT DOCUMENTS

| CN | 101728896 A | 6/2010 |
|---|---|---|
| CN | 103890870 A | 6/2014 |

(Continued)

OTHER PUBLICATIONS

Non-English Chinese Office Action dated Jul. 15, 2020 for Application No. 201910092253.9.

*Primary Examiner* — Burton S Mullins
(74) *Attorney, Agent, or Firm* — Schmeiser, Olsen & Watts LLP

(57) ABSTRACT

A cooling system for cooling an electric generator having a stator, a rotor and one or more superconducting coils is provided. The cooling system includes: at least a first cooling unit for cooling at least one of the stator and the rotor, at least a second cooling unit for cooling the superconducting coils, the second cooling unit being thermally connected to the first cooling unit, the first cooling unit providing a hot source for the second cooling unit.

8 Claims, 2 Drawing Sheets

Figure 1:
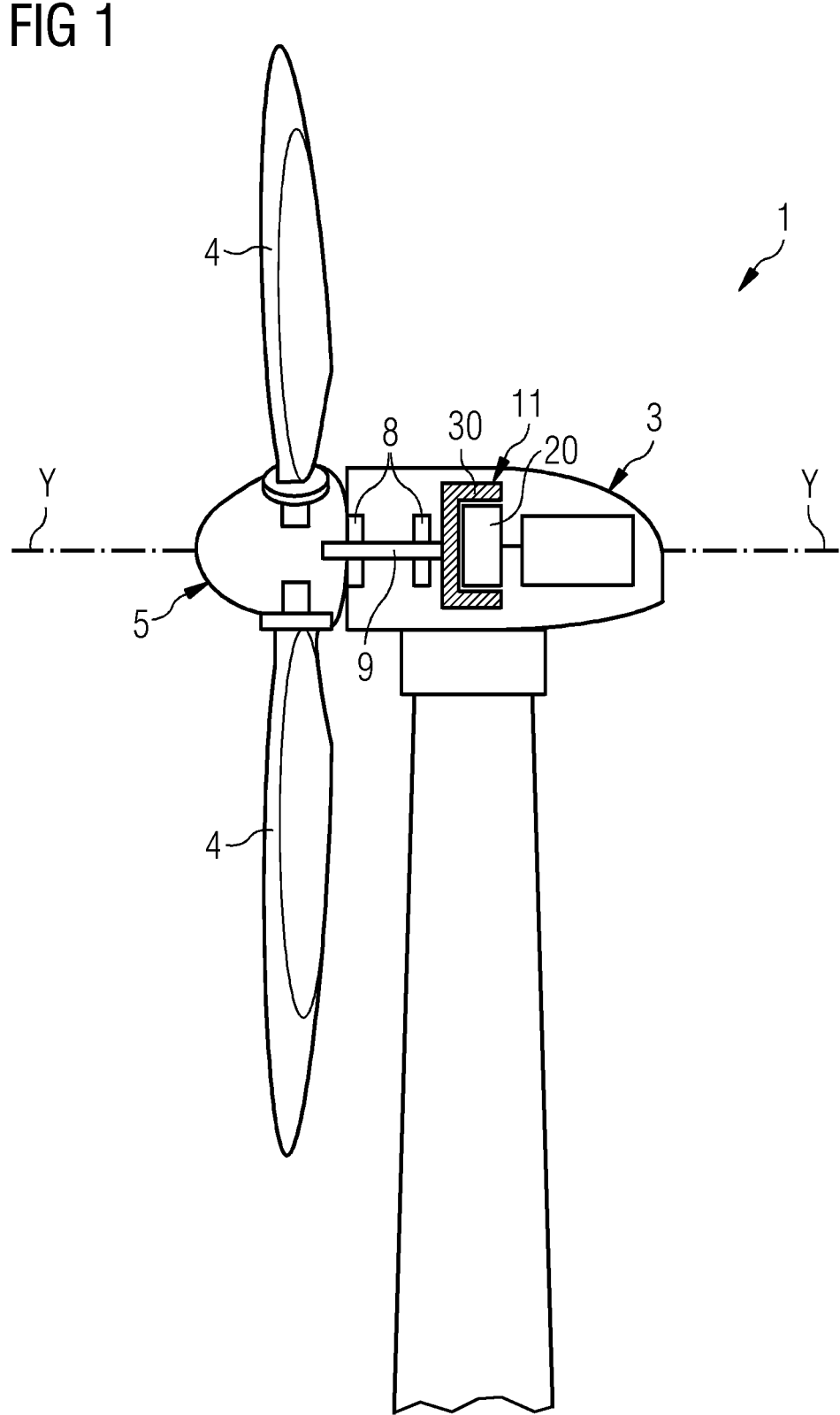

(51) Int. Cl.
  *H02K 1/20* (2006.01)
  *F03D 9/25* (2016.01)
  *H02K 9/197* (2006.01)
  *H02K 7/18* (2006.01)
  *H02K 9/19* (2006.01)

(56) References Cited

U.S. PATENT DOCUMENTS

| | | | | |
|---|---|---|---|---|
| 4,216,398 A | * | 8/1980 | Kullmann | H02K 9/19 |
| | | | | 310/53 |
| 4,365,479 A | * | 12/1982 | Weghaupt | H02K 9/193 |
| | | | | 310/61 |
| 4,816,708 A | * | 3/1989 | Laumond | H02K 55/04 |
| | | | | 310/52 |
| 6,313,556 B1 | * | 11/2001 | Dombrovski | H02K 3/24 |
| | | | | 29/596 |
| 6,438,969 B1 | * | 8/2002 | Laskaris | F25B 25/00 |
| | | | | 310/62 |
| 6,994,602 B2 | * | 2/2006 | Ries | B63H 23/24 |
| | | | | 440/51 |
| 8,436,499 B2 | * | 5/2013 | Zhang | H02K 55/04 |
| | | | | 310/52 |
| 8,453,473 B2 | * | 6/2013 | Gundtoft | H02K 9/19 |
| | | | | 62/259.2 |
| 8,541,902 B2 | * | 9/2013 | Casazza | F03D 80/60 |
| | | | | 290/55 |
| 8,992,170 B2 | * | 3/2015 | Stiesdal | F03D 80/60 |
| | | | | 415/176 |
| 9,091,249 B2 | * | 7/2015 | Sabhapathy | F03D 80/88 |
| 9,531,240 B2 | * | 12/2016 | Deicke | H02K 7/116 |
| 9,698,641 B2 | * | 7/2017 | Folie | H02K 9/005 |
| 9,728,313 B2 | * | 8/2017 | Frank | H02K 55/04 |
| 2006/0071575 A1 | * | 4/2006 | Jansen | H02K 1/20 |
| | | | | 310/266 |
| 2010/0102653 A1 | | 4/2010 | Gundtoft | |
| 2012/0196753 A1 | | 8/2012 | Laskaris et al. | |
| 2013/0270937 A1 | * | 10/2013 | Rasmussen | H02K 9/19 |
| | | | | 310/54 |
| 2014/0175802 A1 | * | 6/2014 | Taniyama | H02K 7/1838 |
| | | | | 290/55 |
| 2016/0204667 A1 | * | 7/2016 | Morrison | H02K 55/04 |
| | | | | 310/45 |
| 2018/0062484 A1 | * | 3/2018 | Martinez Fernandez | H02K 55/02 |
| 2018/0081012 A1 | * | 3/2018 | Biber | H01F 6/04 |

FOREIGN PATENT DOCUMENTS

| | | | | |
|---|---|---|---|---|
| EP | 2651009 A2 | | 10/2013 | |
| EP | 2803855 | * | 11/2014 | F03D 80/60 |
| JP | 01110054 A | * | 4/1989 | H02K 55/04 |
| JP | H01144356 A | | 6/1989 | |
| WO | 2014180701 A2 | | 11/2014 | |

* cited by examiner

COOLING SYSTEM FOR A SUPERCONDUCTING GENERATOR

CROSS-REFERENCE TO RELATED APPLICATION

This application claims priority to European application No. EP 18154252.3, having a filing date of Jan. 30, 2018, the entire contents of which are hereby incorporated by reference.

FIELD OF TECHNOLOGY

The following relates to a cooling system for a superconducting electric generator. Particularly, but not exclusively, the following may be applied to a cooling system serving an electric generator in a wind turbine.

BACKGROUND

In the above described technical field, it is known to use superconducting electric generators for wind turbines. The use of superconductors in wind turbines is attractive because it permits to reduce weight or to generate a larger amount of power.

In order to remove the heat generated in the coil, the above described superconducting generator typically includes a cooling system for reducing the coil temperature down to the cryogenic temperature, i.e. below the temperature of 77 K.

Usually only the coils are cooled by the cooling system, because, in order to avoid or limit as much as possible losses, superconducting generators are without stator iron core.

The absence of the stator iron core in an electric generator is however not practical. The iron core provides a mechanical support for the coils, both during manufacturing and operations.

There may be therefore still a need for providing a wind turbine including a superconducting electric generator and a cooling system for cooling efficiently the electric generator, maximizing the above described advantages and, at the same time, minimizing the above described disadvantages.

SUMMARY

An aspect relates to a cooling system for cooling an electric generator having a stator, a rotor and one or more superconducting coils,
wherein the cooling system comprises:
at least a first cooling unit for cooling the stator and/or the rotor,
at least a second cooling unit for cooling the superconducting coils, the second cooling unit being thermally connected to the first cooling unit, the first cooling unit providing a hot source for the second cooling unit.

Advantageously, the thermal connection between the first cooling unit and the second cooling unit permits to design the second cooling unit without taking ambient temperatures into account. Only the first cooling unit has to be designed with sufficient thermal capacity to handle high ambient temperatures. This permits to manufacture a less powerful and consequently less expensive second cooling unit.

Embodiments of the invention can be efficiently adapted to a superconducting electric generator of a wind turbine.

According to embodiments of the present invention, the first cooling unit is connected to an ambient environment, providing a hot source for the first cooling unit, a first cooling medium being circulated in the first cooling unit, the first cooling medium exchanging thermal energy with the ambient environment in the first cooling unit.

The first cooling medium may be, for example a mixture of water and glycol.

The first cooling medium provides the thermal exchange with the ambient environment.

According to embodiments of the present invention, a second cooling medium is circulated in the second cooling unit, the second cooling medium exchanging thermal energy with the first cooling medium in the second cooling unit.

The second cooling medium provides the thermal exchange with the superconducting coils of the stator.

According to embodiments of the present invention, the cooling system comprises a pressure control vessel for controlling the pressure of the second cooling medium, the pressure control vessel being interposed between the second cooling unit and the superconducting coils. Advantageously, the second cooling medium may be nitrogen or helium or another gas with low boiling point, in order that the second cooling medium can be used in the liquid phase at a very low temperature to cool the superconducting coils below the cryogenic temperature.

According to embodiments of the present invention, the pressure control vessel provides a housing for both the vapor phase and the liquid phase of the second cooling medium.

BRIEF DESCRIPTION

Figure 2:
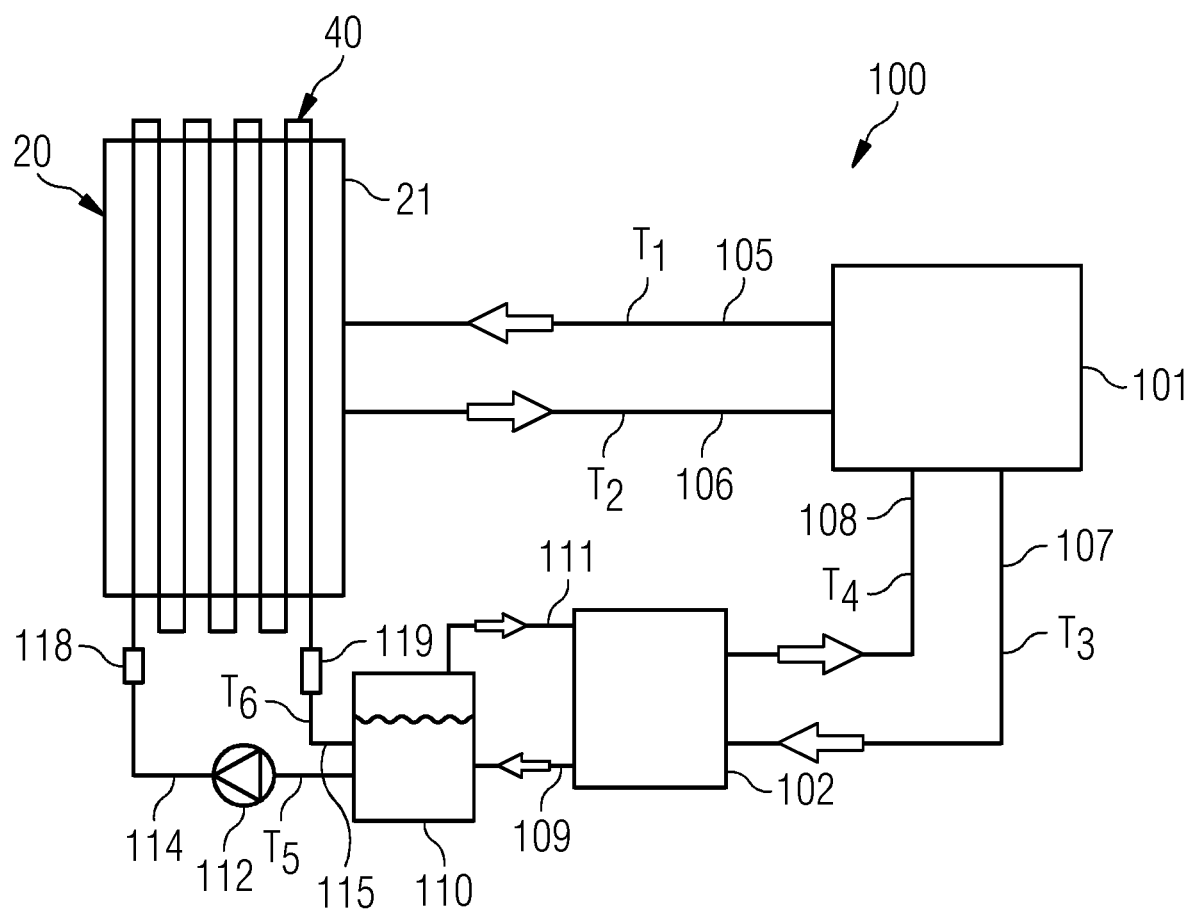

Some of the embodiments will be described in detail, with references to the following Figures, wherein like designations denote like members, wherein:

FIG. 1 shows a schematic section of a wind turbine including an electric generator and a cooling system according to embodiments of the present invention; and FIG. 2 shows a schematic view of the cooling system according to embodiments of the present invention.

DETAILED DESCRIPTION

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y. The blades 4 extend radially with respect to the rotational axis Y.

The wind turbine 1 comprises a permanent magnet electric generator 11.

According to other possible embodiments of the present invention (not represented in the attached figures), embodiments of the present invention may be applied to any other type of permanent magnet machine with either internal or external rotor.

The wind rotor 5 is rotationally coupled with the permanent magnet generator 11 either directly, e.g. direct drive or by means of a rotatable main shaft 9 and through a gear box (not shown in FIG. 1). A schematically depicted bearing assembly 8 is provided in order to hold in place the main shaft 9 and the rotor 5. The rotatable main shaft 9 extends along the rotational axis Y.

The permanent magnet electric generator 10 includes a stator 20 and a rotor 30. The rotor 30 is rotatable with respect to the stator 20 about the rotational axis Y.

FIG. 2 schematically shows a partial view of the stator 20 and of a cooling system 100 for cooling the electric generator 11. The stator 20 comprises one or more superconducting coils 40 wound on a stator iron core 21.

The cooling system 100 comprises a first cooling unit 101 for cooling the stator iron core 21. The first cooling unit 101 is a heat exchanger where a first cooling medium is circulated.

According to possible embodiment of the invention, the first cooling medium is a mixture of water and glycol.

In the first cooling unit 101 the first cooling medium exchanges thermal energy with the ambient environment, which represents the hot source for the first cooling unit 101.

The first cooling unit 101 is connected to the stator iron core 21 through a first duct 105, delivering the mixture of water and glycol to the stator iron core 21 at a first temperature T1.

According to possible embodiments of the present invention, the first temperature T1 is comprised between −50° C. and 30° C.

Particularly, the first temperature T1 may be comprised between −30° C. and −10° C.

From the first duct 105 the first cooling medium enters the stator iron core 21, which represents a cold source for the first cooling unit 101. Through the mixture of water and glycol at the first temperature T1 the stator iron core 21 is kept at a desired low temperature, by removing the iron losses in the iron core 21 and to allow the superconducting coils 40 to stay below the cryogenic temperature of 77 K.

Indirectly, also the rotor 30 is cooled by the thermal exchange between the first cooling medium and the stator iron core 21, cooling power being transferred to the rotor 30 through the air gap between the stator 20 and the rotor 30 by connection and/or radiation.

From the stator iron core 21 the first cooling medium is delivered back to the first cooling unit 101 through a second duct 106, delivering back the mixture of water and glycol from the stator iron core 21 at a second temperature T2, greater than the first temperature T1.

According to embodiments of the present invention, the second temperature T2 is 5 K to 15 K higher than the inlet temperature.

The thermal exchange with the ambient environment performed in the first cooling unit 101 permits to cool the mixture of water and glycol to reach again the first temperature T1.

The cooling system 100 comprises a second cooling unit 102 for cooling the superconducting coils 40 below the cryogenic temperature of 77 K. The second cooling unit 102 is thermally connected to the first cooling unit 101, the latter providing a hot source for the second cooling unit 102.

The second cooling unit 102 is a heat exchanger connected to the first cooling unit 101 through a third duct 107, delivering the mixture of water and glycol to the second cooling unit 102 at a third temperature T3.

According to a possible embodiment of the present invention, the third temperature T3 has a value of −50° C.

According to possible embodiments of the present invention, the third temperature T3 may have the same value of the first temperature T1.

From the third duct 107 the first cooling medium enters the second cooling unit 102, which represents a second cold source for the first cooling unit 101. The mixture of water and glycol at the third temperature T3 exchange thermal energy with a second cooling medium which is circulated in the second cooling unit 102.

According to possible embodiments of the present invention, the second cooling medium may be a gas with low boiling point like nitrogen (N) or helium (He). In the second cooling unit 102 the second cooling medium is cooled by exchanging thermal energy with the first cooling medium. In particular, the second cooling medium in the second cooling unit 102 may change its phase from the vapor to the liquid phase.

According to other embodiments of the present invention, the second cooling medium may be sub-cooled and therefore the phase change does not occur.

From the second cooling unit 102 the first cooling medium is delivered back to the first cooling unit 101 through a fourth duct 108, delivering back the mixture of water and glycol to the first cooling unit 101 at a fourth temperature T4, greater than the third temperature T3.

According to possible embodiments of the present invention, the fourth temperature T4 may have the same value of the second temperature T2.

The thermal exchange with the ambient environment performed in the first cooling unit 101 permits to cool the mixture of water and glycol to reach again the third temperature T3.

According to the above described scheme, the second cooling unit 102 can be designed without taking ambient temperatures into account. Only the first cooling unit 101 has to be designed with sufficient thermal capacity to handle high ambient temperatures.

The cooling system 100 further comprises a pressure control vessel 110 for controlling the pressure of the second cooling medium. The pressure control vessel 110 is interposed between the second cooling unit 102 and the superconducting coils 40 and houses both vapor and liquid phases of the second cooling medium.

The second cooling unit 102 is connected to the pressure control vessel 110 through a fifth duct 109, delivering the liquefied second cooling medium to the pressure control vessel 110. From the pressure control vessel 110 the second cooling medium in the vapor phase is delivered back to the second cooling unit 102 through a sixth duct 111.

The pressure control vessel 110 is connected to the superconducting coils 40 through a seventh duct 114, delivering the liquefied second cooling medium to the superconducting coils 40 at a fifth temperature T5.

According to a possible embodiment of the present invention, when the second cooling medium is nitrogen, the fifth temperature T5 has a value of −206° C.

According to other possible embodiment of the present invention, the fifth temperature T5 may have different value depending on the nature of the second cooling medium. For example, when the second cooling medium is helium, the fifth temperature T5 may be lower than −206° C. In the seventh duct 114 a circulation pump 112 and a first electric connection 118 for the superconducting coils 40 are provided. Through the liquefied second cooling medium at the fifth temperature T5 the superconducting coils 40 are kept below the cryogenic temperature of 77 K.

From the superconducting coils 40 the liquified second cooling medium is delivered back to the pressure control vessel 110 through an eighth duct 115, delivering back liquified second cooling medium to the pressure control vessel 110 at a sixth temperature T6, greater than the first fifth temperature T5.

According to a possible embodiment of the present invention, the sixth temperature T6 has a value of −197° C. In any case the sixth temperature T6 is lower than the minimum temperature required to maintain the second cooling medium in the liquid phase. In the eighth duct 115 a second electric connection 119 for the superconducting coils 40 is provided.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A cooling system for cooling an electric generator having a stator including one or more superconducting coils and a stator iron core,
wherein the cooling system comprises:
at least a first cooling unit for cooling at least one of the stator iron core and the rotor, wherein the first cooling unit is connected to an ambient environment, wherein the ambient environment is a hot source for the first cooling unit, wherein a first cooling medium is circulated in the first cooling unit and enters the stator iron core, wherein the first cooling medium exchanges thermal energy with the ambient environment in the first cooling unit; and
at least a second cooling unit for cooling the one or more superconducting coils, the second cooling unit being thermally connected to the first cooling unit, wherein the first cooling unit is a hot source of the second cooling unit, wherein a second cooling medium is circulated in the second cooling unit, wherein the second cooling medium exchanges thermal energy with the first cooling medium in the second cooling unit.

2. The cooling system of claim 1, wherein the first cooling medium is a mixture of water and glycol.

3. A system comprising:
the cooling system of claim 1; and
an electric generator having a stator, a rotor, and one or more superconducting coils, wherein the cooling system comprises a pressure control vessel for controlling the pressure of the second cooling medium, the pressure control vessel being interposed between the second cooling unit and the one or more superconducting coils.

4. The cooling system of claim 3, wherein a vapor phase and a liquid phase of the second cooling medium are housed in the pressure control vessel.

5. The cooling system of claim 1, wherein the second cooling medium is nitrogen or helium.

6. A wind turbine including:
an electric generator having a stator, a rotor and one or more superconducting coils, and a cooling system according to claim 1.

7. The cooling system of claim 1, wherein the first cooling unit cools the rotor.

8. A system comprising:
an electric generator having a stator, a rotor, and one or more superconducting coils, and a stator iron core;
a cooling system for cooling the electric generator, the cooling system including at least a first cooling unit for cooling at least one of the stator iron core and the rotor, wherein the first cooling unit is connected to an ambient environment, wherein the ambient environment is a hot source for the first cooling unit, wherein a first cooling medium is circulated in the first cooling unit and enters the stator iron core, wherein the first cooling medium exchanges thermal energy with the ambient environment in the first cooling unit; and at least a second cooling unit for cooling the one or more superconducting coils, the second cooling unit being thermally connected to the first cooling unit, wherein the first cooling unit is a hot source of the second cooling unit, wherein a second cooling medium is circulated in the second cooling unit, wherein the second cooling medium exchanges thermal energy with the first cooling medium in the second cooling unit,
wherein the cooling system comprises a pressure control vessel for controlling the pressure of the second cooling medium, the pressure control vessel being interposed between the second cooling unit and the one or more superconducting coils.

* * * * *